US010213843B2

(12) United States Patent
Rebholz

(10) Patent No.: US 10,213,843 B2
(45) Date of Patent: Feb. 26, 2019

(54) STOP FOR A DRILLING, MILLING OR COUNTERSINKING TOOL

(71) Applicant: Gühring KG, Albstadt (DE)

(72) Inventor: Felix Rebholz, Stetten-Frohnstetten (DE)

(73) Assignee: Guehring KG, Albstadt (DE)

( * ) Notice: Subject to any disclaimer, the term of this patent is extended or adjusted under 35 U.S.C. 154(b) by 0 days.

(21) Appl. No.: 15/427,443

(22) Filed: Feb. 8, 2017

(65) Prior Publication Data

US 2017/0274459 A1    Sep. 28, 2017

Related U.S. Application Data

(63) Continuation of application No. PCT/EP2015/068542, filed on Aug. 12, 2015.

(30) Foreign Application Priority Data

Aug. 12, 2014    (WO) ............... PCT/EP2014/067277
Oct. 30, 2014    (DE) ................... 10 2014 115 768

(51) Int. Cl.
*B23B 49/00* (2006.01)
*B23B 51/10* (2006.01)
*B23C 9/00* (2006.01)

(52) U.S. Cl.
CPC .......... *B23B 49/005* (2013.01); *B23B 51/104* (2013.01); *B23C 9/00* (2013.01);
(Continued)

(58) Field of Classification Search
CPC ....... Y10T 408/8925; Y10T 279/17821; B23B 49/005; B23B 49/003; B23B 51/04;
(Continued)

(56) References Cited

U.S. PATENT DOCUMENTS 2,192,528 A * 3/1940 Schmidt ............... B23B 51/104
408/112
2,383,854 A    8/1945 Gwinn, Jr. et al.
(Continued)

FOREIGN PATENT DOCUMENTS

DE    101 54 434 A1    6/2003
DE    10 2008 022968 A1    8/2009
(Continued)

OTHER PUBLICATIONS

International Search Report (Application No. PCT/EP2015/068542) dated Oct. 22, 2015, 6 pages.
(Continued)

*Primary Examiner* — Daniel Howell
*Assistant Examiner* — Yasir Diab
(74) *Attorney, Agent, or Firm* — Burr & Brown, PLLC

(57) ABSTRACT

The invention relates to a stop for a rotating drilling, milling or countersinking tool which comprises a stop sleeve which is freely rotatably coupled, by means of a sliding or rolling bearing, around the tool. A first bearing bush of the bearing supports the stop sleeve. A second bearing bush of the bearing sits in a rotationally fixed manner on a shaft sleeve. The shaft sleeve can be pushed and fastened on a shaft of the tool. In a secondary aspect, the invention relates to a drilling, milling or countersinking tool having such a stop.

15 Claims, 9 Drawing Sheets

(52) U.S. Cl.
CPC . *B23B 2260/008* (2013.01); *B23B 2260/0482* (2013.01); *B23B 2260/12* (2013.01); *B23C 2255/08* (2013.01); *B23C 2255/12* (2013.01); *B23C 2260/08* (2013.01); *Y10T 408/8925* (2015.01)

(58) Field of Classification Search
CPC .... B23B 2260/0482; B23B 2260/0485; B23B 2260/12; A61B 2090/036; A61B 2090/034; A61B 2090/033; B23C 2255/08; B23C 2255/12
See application file for complete search history.

(56) References Cited

U.S. PATENT DOCUMENTS

| | | | | |
|---|---|---|---|---|
| 2,408,652 | A * | 10/1946 | King | B23B 31/02 |
| | | | | 408/113 |
| 2,477,891 | A * | 8/1949 | O'Neill | B23B 49/005 |
| | | | | 408/113 |
| 2,522,330 | A * | 9/1950 | Wright | B23B 51/104 |
| | | | | 408/113 |
| 3,126,793 | A * | 3/1964 | Jennings | B23B 49/003 |
| | | | | 407/120 |
| 3,211,060 | A * | 10/1965 | McCann | B23Q 1/265 |
| | | | | 409/135 |
| 4,961,674 | A * | 10/1990 | Wang | A61C 8/0089 |
| | | | | 408/112 |
| 5,993,453 | A * | 11/1999 | Bullara | A61B 17/16 |
| | | | | 606/79 |
| 7,131,798 | B2 * | 11/2006 | Karlsson | B23B 27/141 |
| | | | | 408/191 |
| 7,607,871 | B1 | 10/2009 | Nelson | |
| 2009/0029636 | A1 * | 1/2009 | Fujii | A61B 17/1617 |
| | | | | 451/451 |

FOREIGN PATENT DOCUMENTS

| | | |
|---|---|---|
| GB | 488 242 A | 7/1938 |
| GB | 2 269 333 A | 2/1994 |

OTHER PUBLICATIONS

International Search Report (Application No. PCT/EP2014/067277) dated Nov. 26, 2014, 5 pages.

* cited by examiner

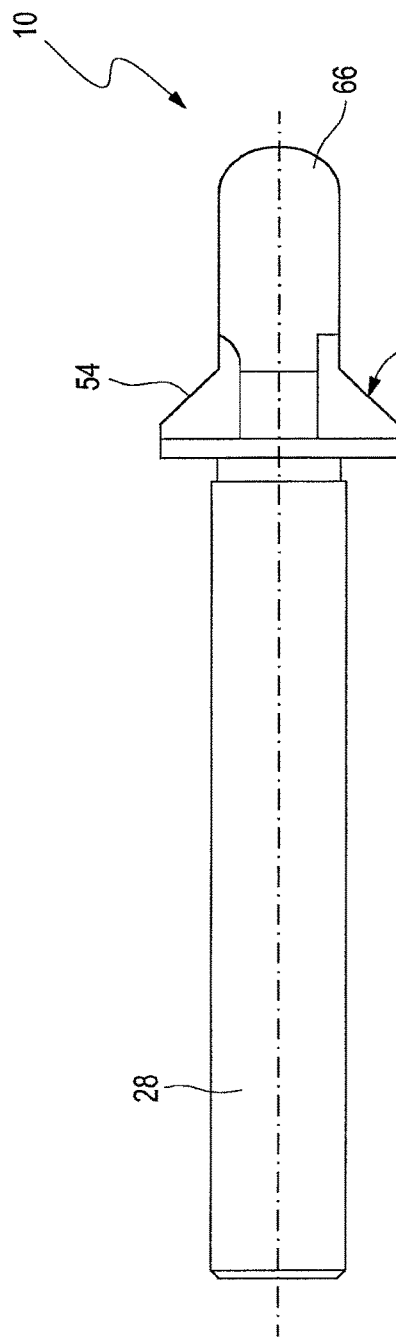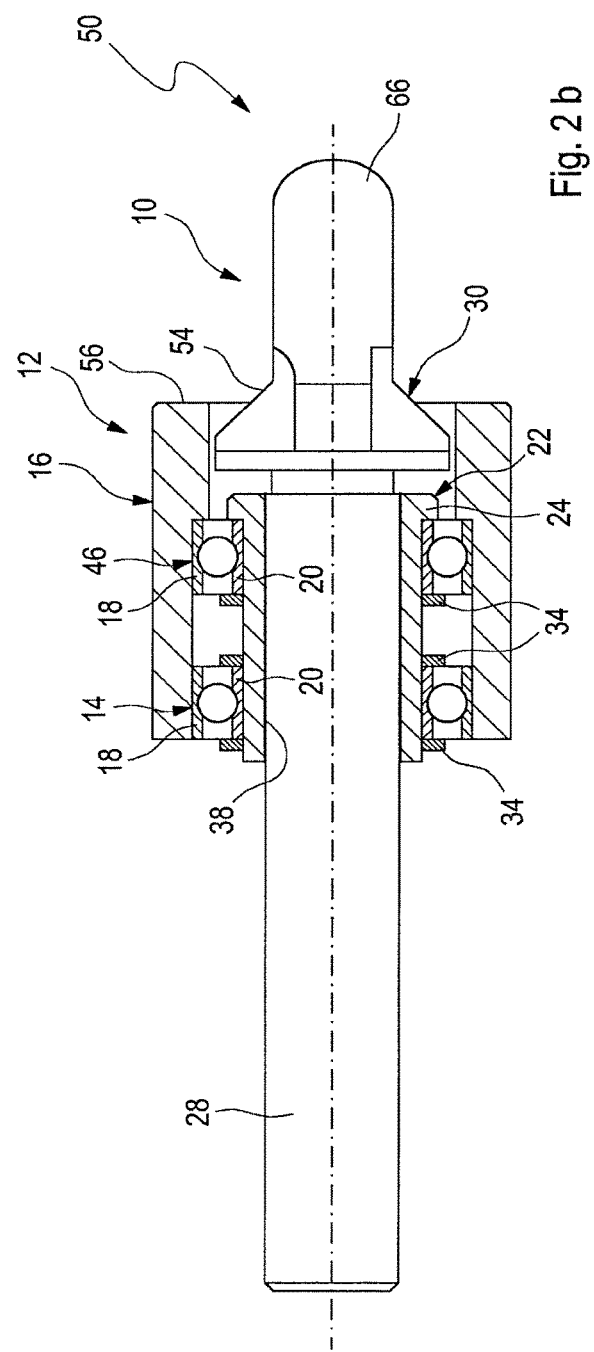

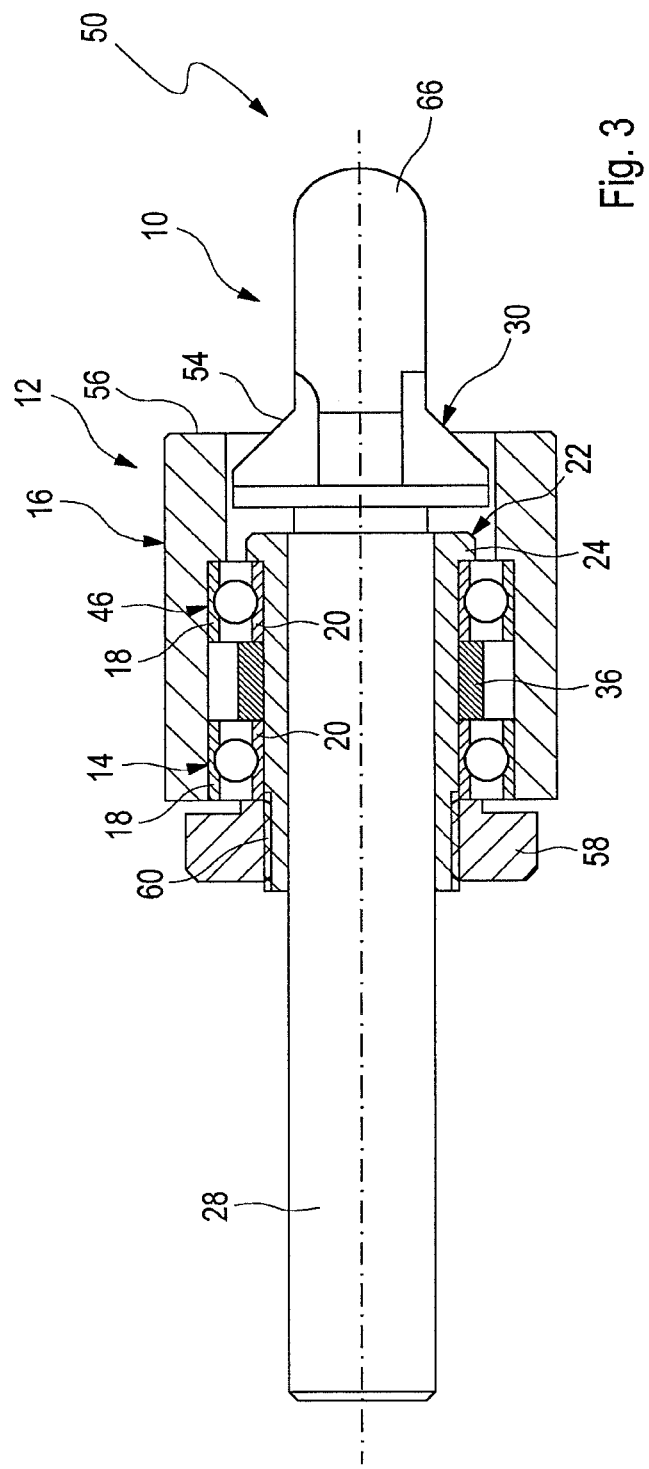

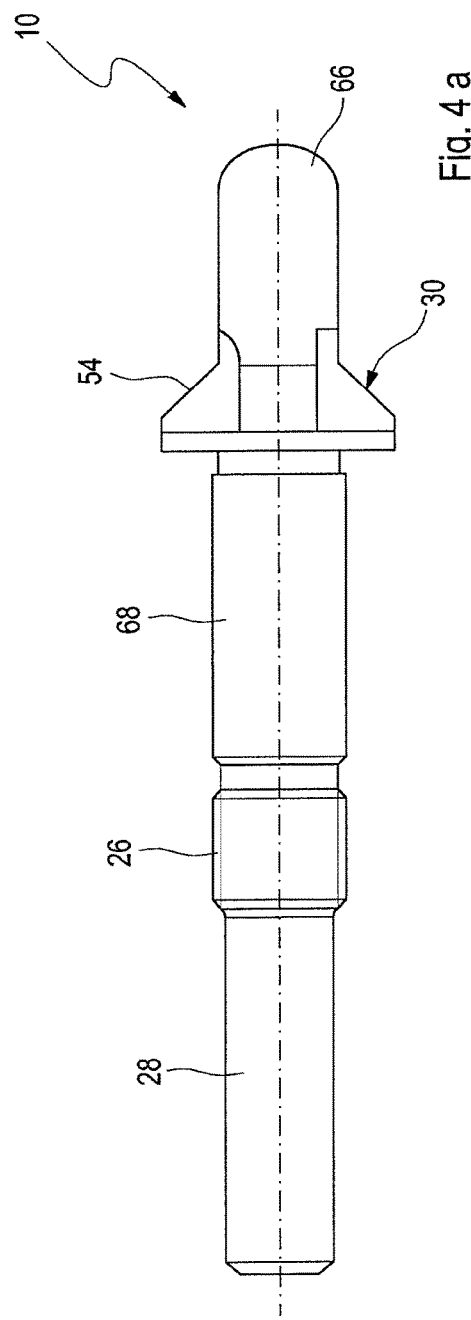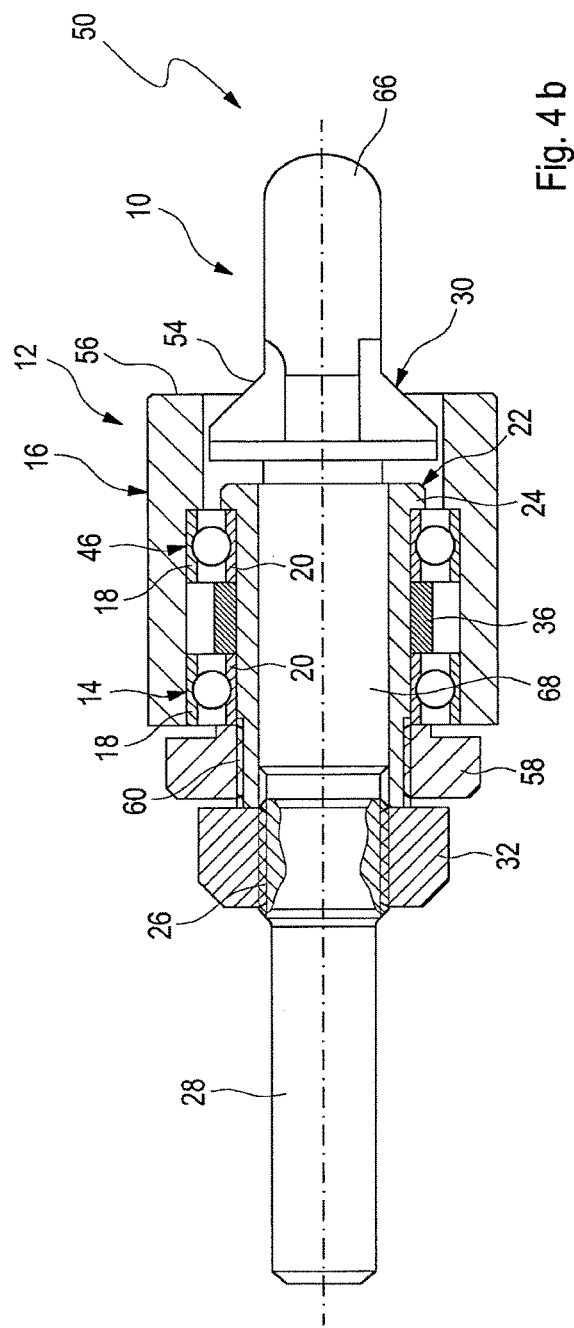

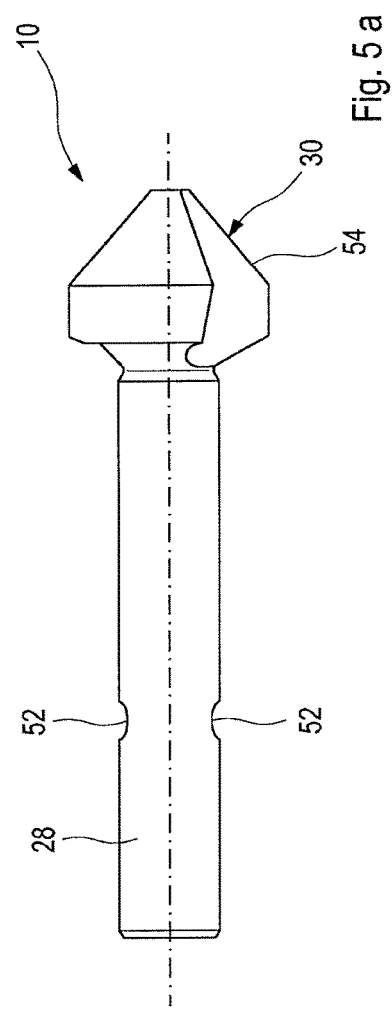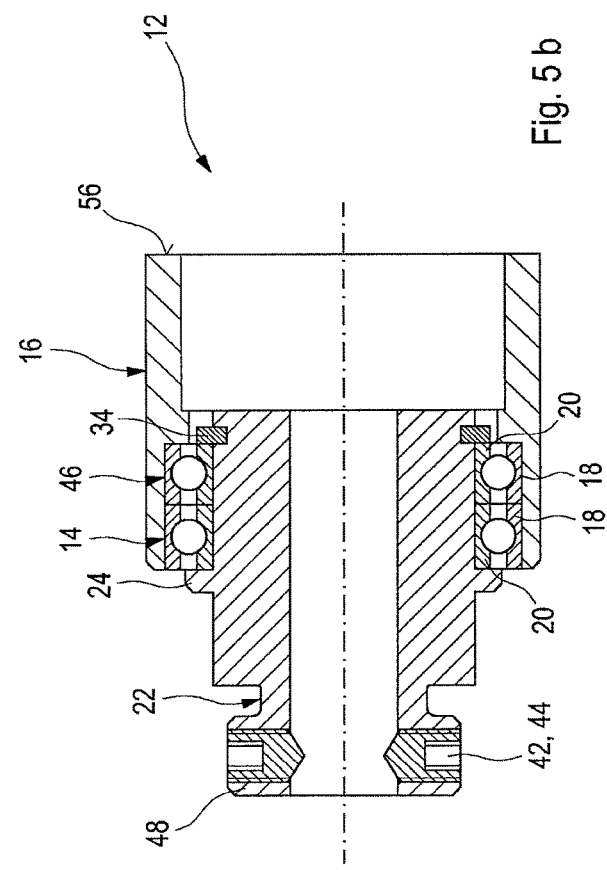

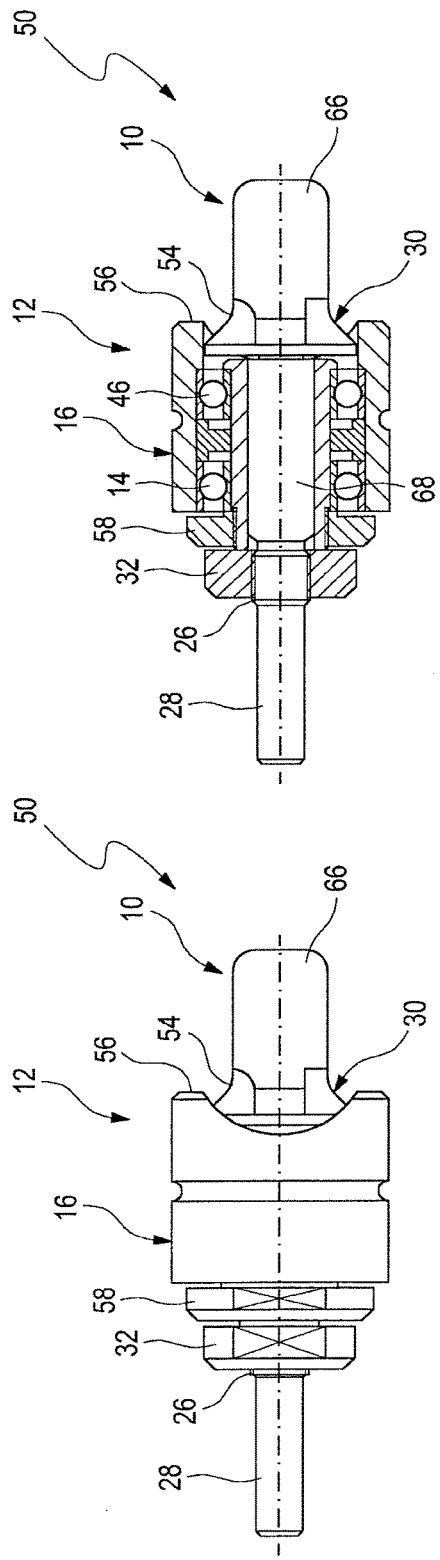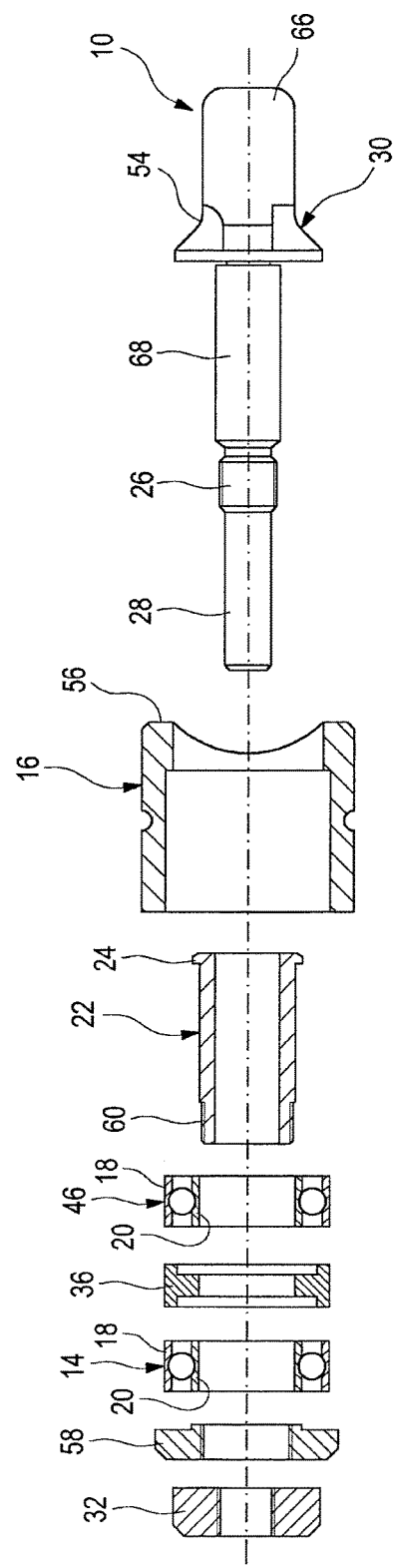

STOP FOR A DRILLING, MILLING OR COUNTERSINKING TOOL

The invention relates to a stop for a rotary drilling, milling or countersinking tool and a tool, a stop being fastened on the tool shank of the tool.

PRIOR ART

Stops for a drilling, milling or countersinking tool are known from the prior at, which stops are termed what are known as "microstop" adapters. These adapters generally comprise a drill shank for accommodation in a chuck of a lathe or a handheld rotary tool, and a bearing, using which a stop sleeve can rotate freely about a drilling, milling or countersinking head inserted into the adapter, so that when a predetermined penetration depth into a component is reached, the stop sleeve can rest on the surface of the component and the drilling, milling or countersinking head can rotate freely. Stops of this type are used for countersinking or milling operations in vehicle and aircraft manufacture in particular.

In use, the drill shank of such microstop adapters is accommodated in a chuck of a drilling tool, for example a drilling machine, or a milling tool. The stop sleeve can be provided with an axial adjusting thread, using which the longitudinal position of the stop sleeve relative to the tool head can be adjusted and thus the stop depth can be set. The adapter has a receptacle, for example a screw thread, a bayonet fitting or a quick clamping device for accommodating the drilling, milling or countersinking head, in order to mount the same centrically in the stop sleeve. Thus, known microstop adapters comprise a drill shank and the freely rotatably mounted stop sleeve, and the tool head can be exchanged, if required. Thus, a stop adapter with a drill shank is provided, in which a machining tool head can be inserted for rotary machining.

DE 101 54 434 B4 discloses a stop device with tool shank, which comprises a freely rotatable stop sleeve, which can be rotated about a tool shank of the stop device by means of a single rotary bearing. A drilling or milling tool can be inserted into the tool shank of the stop device and locked in a rotationally fixed manner.

GB 4 882 42 A discloses a stop adapter, which comprises a stop sleeve with spindle shaft, on which the stop sleeve is rotatably mounted, and in which a tool, for example a counter sinking tool bit can be inserted. Thus, this is a generic, aforementioned microstop adapter, which cannot subsequently be applied to a cutting tool with shank.

Further generic microstop-adapter stop sleeves with adapter receptacles for a tool bit provided specifically therefor are provided in U.S. Pat. No. 7,607,871 B1 and GB 22 693 33 A.

A plurality of embodiments of microstop adapters are in turn presented in DE 10 2008 022968 A1, wherein a tool with a tool shank is also presented, in which the tool shank carries a threaded section, on which an adjustment sleeve can be screwed and fixed in position by means of an Allen bolt. The adjustment sleeve has a locking ring, on which a stop sleeve can be snap fastened to the adjustment sleeve in a frictionally engaged manner and can be carried along rotationally. The tool shank of the tall must have a corresponding threaded section, in order to be able to fasten the stop sleeve.

In known microstop adapters, this results in the problem that, due to the replaceable insertion of the tool head into the adapter receptacle, not very smooth running of the tool head and thus low-quality drilling, countersinking or milling processing may occur. Furthermore, in the case of incorrect mounting or mounting play between the adapter and tool head, not only the smooth running, but also the angular position of the tool head at the drilling depth may be changed unfavourably, so that machining quality is lowered. Different results may occur, depending on the direction in which a worker exerts pressure onto the tool.

Starting from the problem presented above, an object is established, to construct a stop for a drilling, countersinking or milling tool, which enables an optimum smooth running, a defined placement angular position for the clamping processing and a precise stop setting and can be fastened onto a conventional cutting tool with an unthreaded tool shank, and therefore overcomes the previously mentioned disadvantages of the prior art.

This object is achieved by means of a stop and a drilling tool, which is equipped with a stop of this type. Advantageous developments of the invention are the subject of the dependent claims.

DISCLOSURE OF THE INVENTION

In a first aspect according to the invention, a stop for a rotary drilling, milling or countersinking tool is suggested, wherein a stop sleeve is arranged in a freely rotating manner on the drilling tool by means of a plain or rolling bearing. It is suggested that a first bearing bushing of the roller or plain bearing carries the stop sleeve and a second bearing bushing of the bearing sits in a rotationally fixed manner on a shank sleeve. The shank sleeve can be pushed and fastened on a shank of the tool. In other words, a stop is suggested, which can be pushed and fastened directly onto a shank of a one-piece drilling, milling or countersinking tool. The shank sleeve couples the stop sleeve to the tool shank of a rotary tool, which can be inserted into the shank sleeve, via a rotary bearing. The tool shank is in this case realized to be unthreaded, i.e. the tool shank is generally realized to be smooth and without a threaded section. Consequently, there is no radial thickening of the tool shank compared to the nominal shank diameter. The shank sleeve can be fastened in a rotationally fixed manner at an axial position of the tool shank. The position of the shank sleeve on the tool shank and the position of the stop sleeve on the bearing bushing define the penetration depth of the tool, up to which the stop sleeve rests on a surface of a workpiece to be processed. If a penetration depth determined thereby is reached, a front stop ring of the stop sleeve rests on the tool surface, whilst the tool rotates freely with the shank sleeve in the interior, and the stop sleeve can rest by way of the adjustment ring on the component surface, owing to the plain- or roller-bearing coupling.

Thus, instead of a "microstop" adapter with adapter shaft, a "microstop" stop which can be coupled to a drilling, milling or countersinking tool with a one-piece tool shank is suggested, which "microstop" stop can be pushed and fastened on the tool shank of any desired drilling, milling or countersinking tool, and which "microstop" stop can be set on a component, for determining a penetration depth of the tool, using a freely settable stop. The shank of the tool can be clamped directly into a chuck of a lathe or a drilling machine, so that an optimum smooth running is ensured. The application angle of the tool can be chosen optimally, wherein the stop sleeve does not form an indirect connection between the tool head and the driving drilling tool, but rather merely sits on the drill shank of the tool. The depth stop is defined by the position of the shank sleeve on the drill shank and the relative axial position of the freely rotatable stop sleeve relative to the shank sleeve. Any desired rotary tools can be retrofitted with a stop according to the invention.

It is already known from the prior art that a threaded section can be provided on the tool shank, on which threaded section the shank sleeve can be screwed on the tool shank by means of an internal thread. However, to this end, the tool shank must have a tool shank specifically provided therefor, as a result of which the tools used can no longer be used universally, and the shank diameter thereof is enlarged unnecessarily when used without a stop. The shank sleeve can advantageously be adhesively bonded, pressed or clamped on the unthreaded tool shank directly. Any desired rotary cutting tool can be retrofitted with the stop. Thus, the shank sleeve can be adhesively bonded to the shank by means of an adhesive, particularly a metal adhesive, for example by means of a two-component metal adhesive such as a 2K epoxy resin adhesive or 2K acrylic adhesive. Here, any desired set position of the shank sleeve on tool shank can be set very easily and the adhesive can be cured, wherein a simple and cost-effective fastening of the stop on a tool can be achieved. Also, fastening by means of thermal shrink fitting is also conceivable, wherein a heated, expanded shank sleeve is applied onto a tool shank and is cooled at a desired position, in order to provide a non-positive connection. Finally, the shank sleeve can also be fastened on the tool shank by means of a clamping connection, for example by means of a clamping expansion or a clamping collar, clamping bolt or the like. The shank sleeve carries the inner bearing bushings of the stop sleeve. The stop depth is defined by the axial position of the shank sleeve on the tool shank and the position of the stop sleeve compared to the outer bearing bushings.

In an advantageous development, the first bearing bushing can be adhesively bonded or pressed into the stop sleeve. Thus, the axial position of the stop sleeve compared to the bearing bushing can be determined by means of an adhesive or press-fit connection. A metal adhesive can be used as adhesive, a press-fit connection can advantageously be formed as a thermal shrink-fit connection. Thus, on the one hand the axial position of the shank sleeve on the tool shank and on the other hand the position of the stop sleeve compared to the bearing, which connects the stop sleeve to the shank sleeve in a freely rotating manner, emerge as degrees of freedom for setting the stop depth. In an advantageous development, the stop can comprise a lock nut, particularly a knurled nut, which can be screwed on an optional adjusting thread of the tool shank, and which is designed for countering locking of the shank sleeve. The lock nut can effect a counter-locking of the shank sleeve on the tool shank, particularly if the shank sleeve is at least partially screwed on the tool shank by means of a screw connection. The adjustment ring can be countered on the adjusting sleeve by means of the lock nut, so that a stop depth can be fixed and an inadvertent change of the stop depth is prevented. Thus, a large number of countersinking or milling operations can be undertaken with the same result, with the same depth stop, even in the case of a rough handling of the tool. If a lock nut is present, it is furthermore conceivable that the lock nut comprises a set screw, using which the axial position of the lock nut can be fixed on the tool shank. The lock nut can for example engage, orientated radially in the lock nut, into a depression of the tool shank or clamp the lock nut against the shank, and thus fix the rotational position of the lock nut on the tool shank.

The lock nut can advantageously comprise a threaded tool shank or a quick-change tool shank. Thus, the lock nut can at the same time form the end of the tool in the direction of the chuck, and comprise a shank receptacle, for example as tool thread for screwing into a chuck or a quick-change shank, for example a click-change shank. The countersinking tool is accommodated and fixed in the stop and the stop connects the countersinking tool to the chuck. As a result, a tool can be clamped in various types of chucks by means of accommodation in the stop.

One bearing is generally sufficient in order to mount the stop sleeve in a rotatable manner with respect to the shank sleeve. In an advantageous development of the invention, it is suggested to arrange at least one second or further axially offset bearing between the stop sleeve and shank sleeve, so that a parallel orientation of the stop sleeve with respect to the tool is ensured. The stop sleeve can be orientated axially centrically with respect to the shank sleeve and thus with respect to the drill shank of the tool by means of a second or further bearings, so that when the stop point is reached, the angular position with respect to the tool axis is precisely defined by the stop. This improves the accuracy of the depth stop and the angular position of the drilling or milling tool when the predetermined stop depth is reached.

The fastening of the shank sleeve on the tool shank can fundamentally take place in any desired manner, for example an external thread may be provided on the tool shank, onto which an internal thread of the shank sleeve can be screwed, or the inner surface of the shank sleeve is adhesively bonded to an outer surface of the tool shank. In a preferred embodiment, the shank sleeve can comprise at least one, particularly two or more, radially acting clamping means in drill shank end region axially opposite the stop sleeve, by means of which clamping means the shank sleeve can be clamped in a rotationally fixed and axially fixing manner to the tool shank. A quick detachability of the stop from the drill shank can be achieved by means of a clamping fastening, and thus a quick replacement or adjustment of the stop depth can be enabled. Furthermore, it is possible to dispense with additional fastening elements on the tool shank, such as a thread, by means of a clamping means, for example a clamp or a clamping bolt. Thus, it is possible to retrofit standard milling, drilling or countersinking tools with a stop, it being possible for the stop to be fastened on the standard milling, drilling or countersinking tools in a clamping manner.

In a preferred embodiment, one or more clamping bolts, in particular Allen bolts, can be used as clamping means, which can preferably engage in a rotationally fixed and axially locking manner in radially orientated engagement recesses or fixing threads of the tool shank. The shank sleeve can be fastened on the tool shank at a desired position by means of clamping bolts, particularly Allen bolts. If engagement recesses, for example countersink recesses, are arranged on the tool shank, then the Allen bolts can engage into these recesses, wherein the shank sleeve is fastened in a rotationally fixed manner at a defined point on the tool shank as a result. Alternatively, radially orientated fixing threads can be arranged in the tool shank, so that Allen bolts can be screwed into the fixing thread, in order to fasten the shank sleeve on the tool shank. The fastening of the stop onto a point on the tool shank specially prepared therefor has the advantage that once a stop depth has been set once, the stop depth can also be retained when changing the tool. Allen bolts can be loosened and tightened easily, so that a quick change of the tool is enabled. Any desired stop depths of the tool can be set by clamping the shank sleeve.

Alternatively to the above embodiment, clamping means, particularly a clamping ring or a clamping collar, may advantageously be included at the shank sleeve, as a result of which the shank sleeve can be fixed in a clamping manner on the tool shank. Clamping means of this type may be a clamping ring or a clamping collar, which can be clamped or loosened in a tool-free manner in particular by means of a clamping lever or a clamping bolt, in order to connect the stop to the tool shank. This facilitates handling, particularly exchanging the tool or displacing the stop on the tool shank, so that any desired stop depths can be set. As a result, the outlay during tool change and the usability of the stop can be expanded considerably.

Drilling, milling or countersinking tools have different radii of the tool shank, depending on the use type. In order to adapt a stop to various tool shank diameters, it may be advantageous that one or more adapter bushings are provided, which can be plugged into the shank sleeve, in order to be able to adapt the internal diameter of the shank sleeve to a varying tool shank diameter. Thus, with a stop and a plurality of adapter bushings, a multiplicity of tools with different shank diameters can be provided with an identical stop, so that a universally exchangeable stop is suggested, which can be plugged or adhesively bonded to any desired tools and/or fastened to the same in a clamping manner. This lowers the purchase costs further and extends the field of application of the stop for a multiplicity of different applications. It is conceivable to assemble a set with a stop and one or more adapter bushings.

In an advantageous development of the invention, a clamping bolt can be arranged on a clamping thread of the shank sleeve, by means of which a bearing play of the rotary bearing can be set. The bearing clamping bolts can be arranged on an external thread of the shank sleeve as bearing clamping thread and can enable an axial play of the bearing, so that on the one hand a slight axial movability of the stop sleeve with respect to the tool axis can be set, and/or a torque of the stop sleeve with respect to the shank sleeve can be set. As a result, a fine adjustment of the stop depth can furthermore be achieved.

In a coordinate aspect, a drilling, milling or countersinking tool with a stop is suggested, wherein a stop according to one of the aforementioned embodiments is fastened on the tool shank. A tool of this type can fundamentally be constructed from a drilling, milling or countersinking tool according to the prior art, combined with a stop, presented above.

The stop can for example be offered as a set with a plurality of different drilling, milling or countersinking tools. The stop can be offered individually or in combination with one or more rotary tools. In the set, one or more adapter bushings can be contained for adapting to various shank diameters of tools. It is possible, by means of the stop, to retrofit standard tools with a depth stop, and thus to achieve the advantage of the invention.

DRAWINGS

Further advantages result from the present description of the drawings. Exemplary embodiments of the invention are illustrated in the drawing. The drawing, the description and the claims contain numerous features in combination. The person skilled in the art will also consider the features expediently and combine the features to form sensible further combinations.

In the figures:

FIG. 2 shows a sectional illustration through an embodiment of a stop with a side illustration of a tool which can be used for this;

FIG. 3 shows a further embodiment of a stop according to the invention in a sectional illustration;

FIG. 4 shows a further embodiment of a stop according to the invention with associated countersinking tool in a sectional illustration;

FIG. 5 shows a sectional illustration through an embodiment of a stop with a side illustration of a tool which can be used for this;

FIGS. 6, 7, 8 show further embodiments of countersinking tools with a stop according to the invention.

Figure 9:
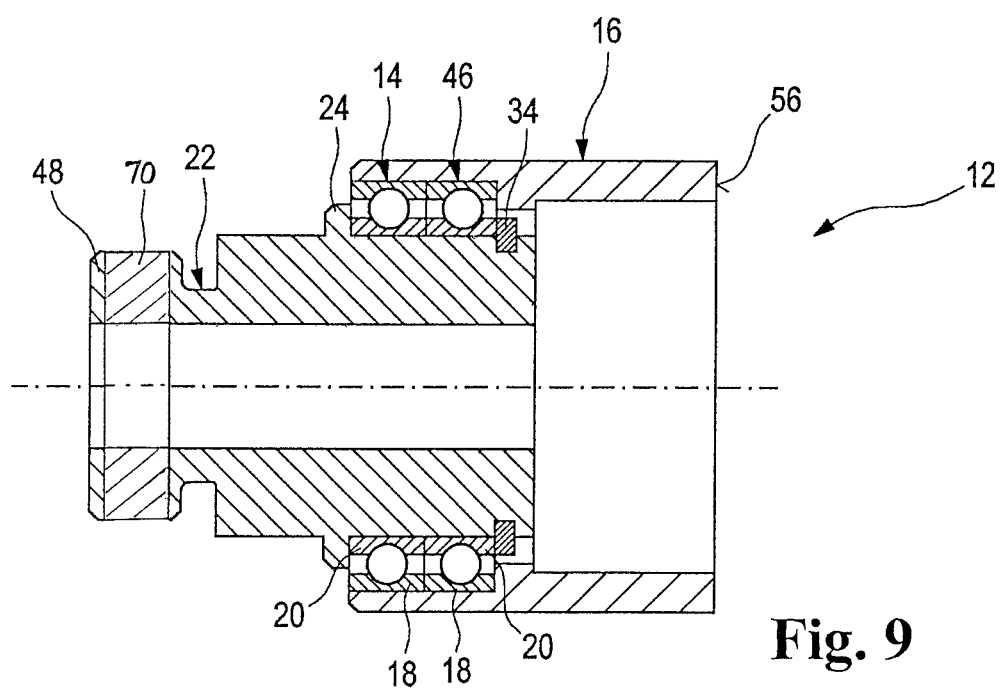

FIG. 9 shows an embodiment similar to the embodiment shown in FIG. 5b, except that the embodiment shown in FIG. 9 has a clamping collar 70 instead of a clamping means 42 and clamping bolts 44.

Figure 10:
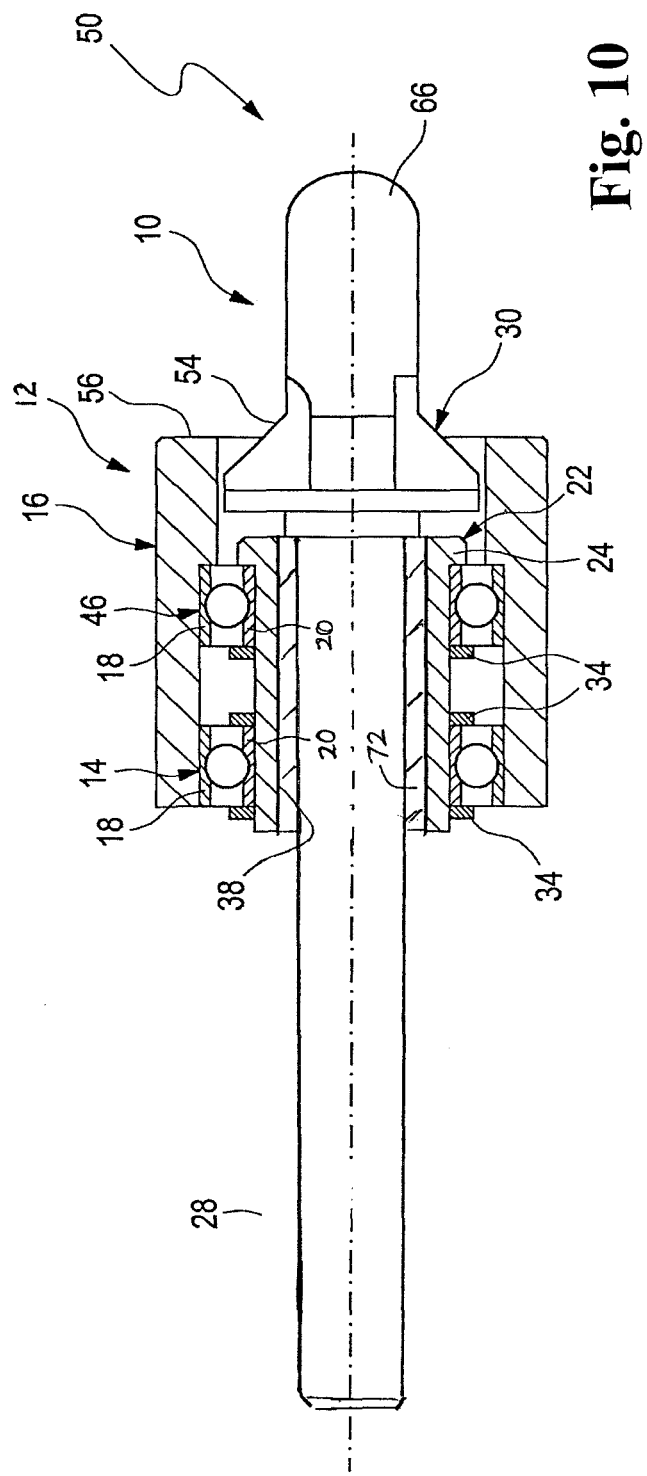

FIG. 10 shows an embodiment that is similar to the embodiment shown in FIG. 2b, except that the embodiment shown in FIG. 10 further comprises an adapter bushing 72.

In the figures, identical or similar components are numbered with the same reference numbers.

Figure 1:
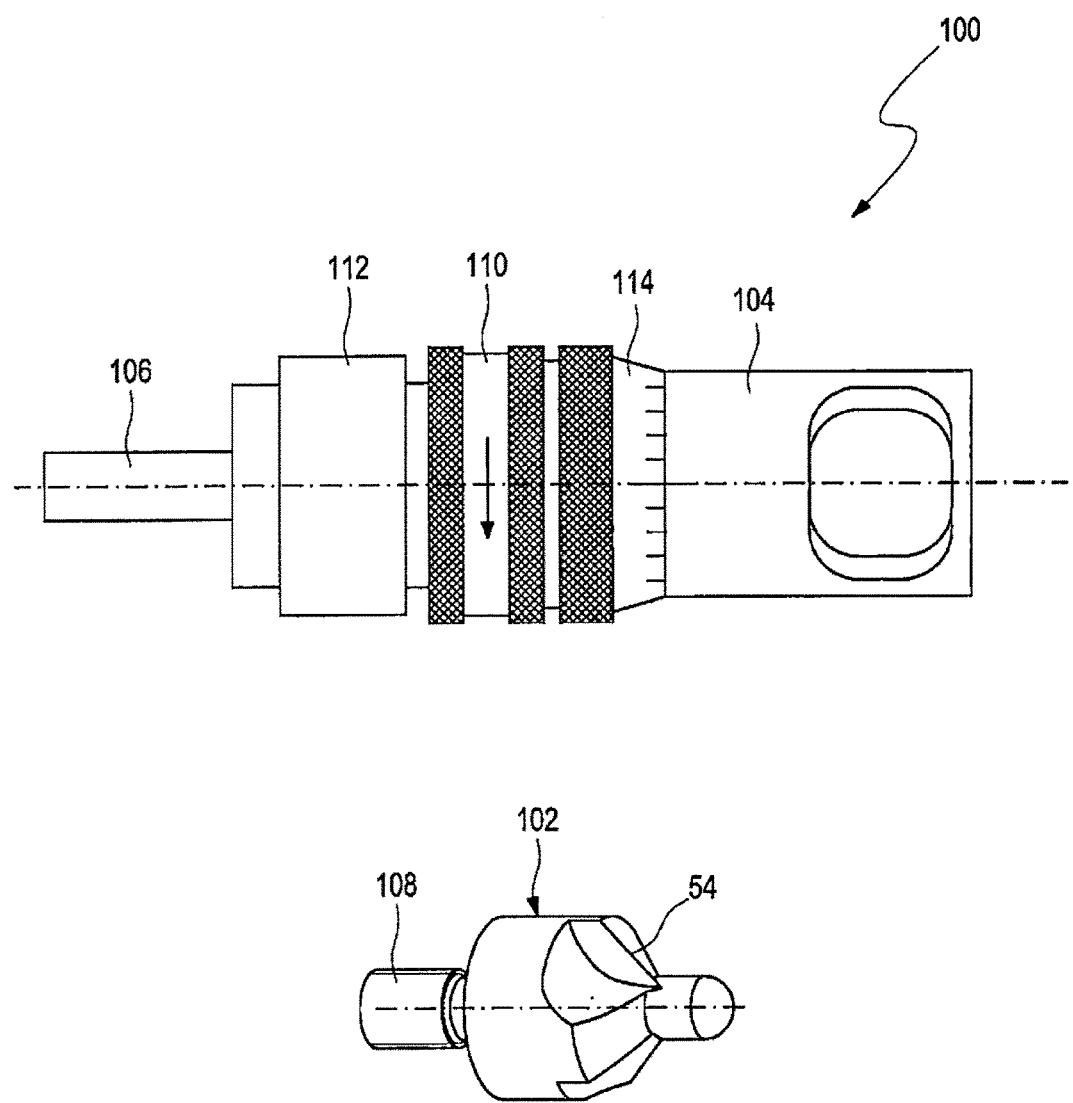
FIG. 1 shows a microstop stop adapter with a tool head according to the prior art.

A stop adapter 100 with stop sleeve from the prior art is illustrated in FIG. 1 in a side illustration. The microstop stop adapter 100 comprises a stop sleeve 104, an adjustment ring 110 with end sleeve 112 and an adapter shank 106. The adjustment ring 110 is coupled to a fine adjustment device 114, wherein the adjustment ring 110 enables a rough adjustment and the fine adjustment device 114 enables a fine adjustment of the stop sleeve 104 with respect to the tool shank 106. To this end, a scale is applied on the final adjustment ring 114. The stop sleeve 104 is freely rotatably mounted with respect to the tool shank 106 by means of a bearing which is not illustrated, so that the stop sleeve allows continued rotation of the tool 100 when placed on the surface of a component, and the stop sleeve 104 can sit in a resting manner on the surface of the component. A tool head 102, in this case a countersinking tool with a multiplicity of cutting edges 54, is illustrated in the lower sub-image, which can be screwed into a thread of the adapter 100 by means of a screw-in thread 108. When mounting the tool head 102 into a thread of the stop adapter 100, there is the risk of faulty axial alignment, so that smooth running of the cutting edges 54 of the tool head 102 with respect to the drill shank 106 does not result, so that a non-smooth running of the countersinking tool results, and when placing and lowering the tool, a circular movement of the tool head does not result and neither can the application angle be set as desired. Thus, different machining results are achieved, depending on the quality of the mounting or the screw-in thread with respect to the tool receptacle of the stop adapter 100. In particular, after long usage, the tool receptacle of the stop adapter may exhibit wear, so that the machining results deteriorate.

FIG. 2 shows a first design of a stop/deburring tool 50. The countersinking tool 10 illustrated in FIG. 2a comprises a tool shank 28 and a head 30, which has a rounded insertion pin 66 and a plurality of deburring or countersinking cutting edges 54.

As illustrated in FIG. 2b, the stop 12 comprises a stop sleeve 16, which is mounted freely rotatably about a shank sleeve 22 by means of two ball bearings 14, 46. The shank sleeve 22 can be pushed axially onto the tool shank 28 up to the tool head 30 and connected in a rotationally fixed non-positive manner on the shank 28 at an axial point on the shank 28, which defines the stop depth, by means of an adhesive connection 38. The first bearing bushing 18 of the first and second ball bearings 14, 46 is adhesively bonded in the inner wall of the stop sleeve 16. The second bearing bushing 20 is fixed on the shank sleeve 22 by means of two bearing rings 34 and can nonetheless be adhesively bonded on the shank sleeve 22. The second bearing bushing 20 of the second ball bearing 46 is locked by a counter-bearing ring 24 of the shank sleeve 22 and a bearing ring 34. The stop sleeve 16 can rotate with respect to the shank sleeve 22 by means of the two bearings 14, 46. The shank sleeve 22 is adhesively bonded in a non-positive manner on the shank 28 of the tool 10, wherein the axial adhesive bonding position defines the stop depth of the tool 10.

A further embodiment of a tool 10 based on FIG. 2 is illustrated in FIG. 3. The shank sleeve 22 has a bearing clamping thread 60 at an axial end facing away from the tool head 30. A bearing clamping nut 58 is screwed on the bearing clamping thread 60. The second bearing bushings 20 of the first and second bearings 14, 46 can be clamped between the bearing clamping nut 58 and a counter-bearing ring 24 of the shank sleeve 22 by means of the bearing clamping nut 58 and a bearing connection sleeve 36. As a result, an axial play of the stop sleeve 16 with respect to the shank sleeve 22 and a bearing talk of the bearings 14, 46 can be set. The shank sleeve 22 can be adhesively bonded on the tool shank 28 by means of a metal adhesive, or connected in a non-positive manner by means of thermal shrink fitting. The axial position of the shank sleeve 22 on the tool shank 28 determines the stop depth of the tool head 30, until the stop ring 56 rests on a surface of a workpiece to be machined.

A further exemplary embodiment of a stop 12 for a tool 10 is illustrated in FIG. 4. The tool 10 illustrated in FIG. 4a has an optional adjusting thread 26 on the tool shank 28 thereof. The stop 12 can be pushed beyond the shank 28 and the adjusting thread 26 onto the shank-sleeve mounting region 68 of the shank 28 in the region of the tool head 30 and adhesively bonded or clamped in the mounting region 68. In addition, it is conceivable that—as known from the prior art—an inner thread section of the shank sleeve 22 is screwed on the adjusting thread 26 at least in certain areas, in order to define an axial position of the stop 12 on the shank 28. The mounting region 68 can have a surface contour for the rotationally fixed locking of the shank sleeve 22, for example longitudinal furrows. The stop 12 corresponds, in terms of the design details thereof, to the embodiment illustrated in FIG. 3. Thus, the stop 12 has a shank sleeve 22, which carries two bearings 14, 46, by means of which a stop sleeve 16 can be rotated about the shank sleeve 22. A bearing play of the bearings 14, 46 can be set by means of a bearing clamping nut 58, which is screwed on a bearing clamping thread 60 of the shank sleeve 22, and by means of a bearing connection sleeve 36 with respect to a counter-bearing ring of the shank sleeve 22. A lock nut 32 is screwed on the adjusting thread 26, which lock nut as a securing means prevents a rearward displacement of the shank sleeve 22 and guarantees the maximum stop depth of the stop sleeve 16. If the shank sleeve 22 is partly screwed on the thread 26, then the lock nut 32 can counter the shank sleeve 22 in a rotationally fixed manner. As a result, the lock nut 32 can set the penetration depth of the deburring tool 50. The adjusting thread 26 of the tool shank 28 is used for fastening the lock nut 32, which defines a maximum penetration depth and e.g. fixes the stop on the shank in the axial direction in the event of the failure of the clamping or the adhesive agent.

In FIGS. 5a and 5b, both the stop 12 and also a countersinking tool 10 of a further exemplary embodiment is illustrated in a side illustration. The stop 12 comprises a shank sleeve 22, which can be pushed on the shank 28 of the tool 10 and clamped in a rotationally fixed manner. The axial end region 48 of the stop 12, which lies in the direction of the drill shank 28 of the inserted tool 10, is radially enlarged and has radially orientated holes, in which clamping bolts 44 engage as clamping means 42, in order to clamp the shank sleeve 22 with respect to the tool shank 28 of the tool 10. The clamping bolts 42 are used for the rotationally fixed axial fixing of the stop 12 on the shank 28 of the countersinking tool 10. The clamping position of the shank sleeve 22 on the shank 28 defines the stop depth. The stop sleeve 16 is mounted in a freely rotating manner on the shank sleeve 22 by means of two bearings 14 and 46. Each bearing 14, 46 has a first outer bearing bushing 18 and a second inner bearing bushing 20. The inner bearing bushing 20 is clamped on the shank sleeve 22 between a counter-bearing ring 24 and a bearing ring 34, whilst the outer bearing bushing 18 is fastened on the stop sleeve 16 by means of an adhesive. Either a lubricating film or balls or cylindrical rolling elements are arranged therebetween, in order to mount the stop sleeve 16 in a freely rotatable manner with respect to the shank sleeve 22. The tool shank 28 of the countersinking tool 10 can be pushed into the shank sleeve 22, wherein the clamping bolts 44 can be screwed into engagement recesses 52 of the drill shank 28, in order to lock the stop 12 on the tool shank 28 in a rotationally fixed manner. The axial longitudinal position of the shank sleeve 22 on the tool shaft 28 is determined by the engagement recesses 52, so that the stop depth is defined by the position of the engagement recesses 52. Thus, the engagement recesses 52 are used for a facilitated fastening, wherein a pre-set stop depth can be retained when exchanging the tool 10.

Figure 7:
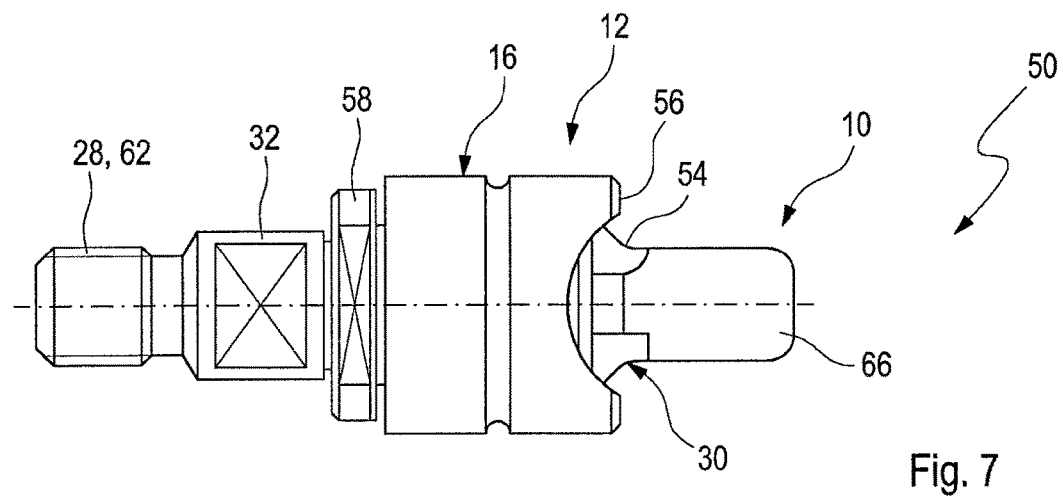
Figure 8:
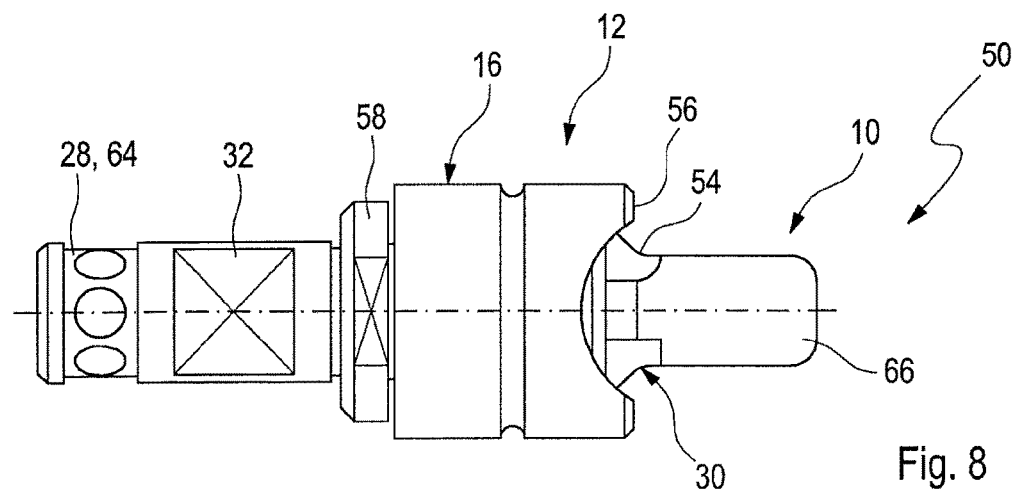

In FIGS. 6, 7 and 8, various embodiments of a stop/countersinking tool 50 are illustrated.

To this end, FIG. 6 shows a countersinking tool 50, which comprises a countersinking tool 10, on which a stop 12 is fastened, and which is equal to the exemplary embodiment of FIG. 4 in terms of basic construction.

FIG. 6a illustrates a side illustration of the countersinking tool 50, and FIG. 6b shows a partial section through the parts of the countersinking tool 50, which define the stop 12. To this end, FIG. 6c shows the individual functional elements of the tool 50 in an extraction illustration.

The countersinking tool 50 with stop comprises a countersinking tool 50, which has a shank 28. An adjusting thread 26 is arranged on the shank 28, which delimits a mounting area of the shank 28 from a shank sleeve mounting area 68. The shank sleeve 22 can be pushed over the rearward end of the shank 28 and the adjusting thread 26 up to the shank sleeve mounting area 68 and adhesively bonded on the shank 28 there using a metal adhesive for example. Thermal shrink fitting of the shank sleeve 22 on the mounting area 68 is also conceivable. A second bearing 46, a bearing connection sleeve 36 with a T-shaped cross section and a first bearing 14 are pushed on the shank sleeve 22, which second bearing and first bearing are clamped on the shank sleeve 22 at the tool-head end of the shank sleeve 22 at a counter-bearing ring 24 and at the other end by means of a bearing clamping nut 58. To this end, a threaded section 60 is provided on the shank sleeve 22, on which the bearing clamping nut 58 can be screwed and can clamp the bearings 14, 46. The first, external bearing bushing 18 can be adhesively bonded or e.g. thermally clamped into an internal sleeve section of the stop sleeve 16. The second internal bearing bushing can be clamped in a longitudinally displaceable manner on the shank sleeve 22 by means of the bearing clamping nut 58, thus the stop can be pulled off the tool shank 28, if required. The stop sleeve 16 has a stop ring surface 56 at the tool-head-side end thereof, which rests on the surface of a workpiece to be machined when a desired countersinking depth is reached. Rotational fixing of the shank sleeve 22 results by means of a lock nut 32 and an axial positioning of the stop can be defined. The lock nut 32 is screwed onto the adjusting-thread section 26 of the tool shank 28 and prevents axial displacement of the stop 12. The lock nut 32 can also take over the task of bearing clamping of the stop sleeve 16. A stop sleeve 16 is mounted rotatably on the shank sleeve 22. The clamping nut 58 is used for setting a bearing play of the stop sleeve 16. The stop sleeve 16 has a front-side stop ring 56, wherein after dipping the insertion pin of the countersinking tool 10 into a hole and deburring the hole opening by means of the cutting edges 54 of the tool head 30, the stop ring 56 sits in a resting manner on a surface of the workpiece to be machined, without scratching the surface and therefore defines a penetration depth of the tool 10 into the hole.

The stop sleeve 16 can have a circumferential stop ring at the end. Advantageously, the stop ring 56 is composed of two, three or more end segments, which are connected to one another by means of curved arcs or set back curved or angled edge regions, as is illustrated in FIG. 6c, 7 or 8. Thus, chips from the machining region can be guided outwards and an improved air supply and cooling of the machining region is enabled. The end segments can be constructed as trapezoidal segment of a circular ring and the set-back edge regions can have a radial course in the axial direction of the tool.

FIG. 7 shows a stop tool 50, like FIG. 6, with the difference that the lock nut 32 forms the chuck-side end of the tool 10, and is formed in one piece with a threaded shank 62 as tool shank 28 for mounting in a threaded receptacle of a rotary or drilling tool. As a result, the lock nut 32 is used simultaneously as a receptacle and clamping bearing of the tool 10.

In the same way, FIG. 8 shows a further stop tool 50, wherein the lock nut 32 comprises a "click-change" quick change shank 64. Alternatively, the tool shank 28 can be constructed in one piece as a threaded shank 62 or quick-change shank 64, wherein the clamping bolt 32 and the shank sleeve 22 with mounted stop sleeve 16 must be dimensioned such that the same can be guided over the shank end 62, 64.

In aircraft manufacture in particular, a multiplicity of identical countersunk recesses must be produced by means of handheld countersinking tools. In particular, recesses are deburred by hand. A worker inserts the pin of the deburring countersink and lowers the stop onto the component until the stop bottoms and stands still, i.e. does not move with respect to the rotating deburring tool. As a result, the surrounding surface around a drilling location is protected and not scratched and the worker can reach a defined countersink depth or deburring quality. The deburring tool can have a cutting bevel or a cutting radius.

A multiplicity of different tools 10 can be retrofitted with a stop by means of a stop 12, wherein due to direct driving of the tool shank 28, incorrect positioning and non-smooth running of the tool head 30 cannot occur and in the event of wear, only the tool 10 is changed and the same stop 12 can be used for a multiplicity of tools 10. The stop 12 can be adapted to various diameters of a tool shaft 28 by means of adapter sleeves. The countersinking tool 10 is clamped directly using a chuck of a lathe or drilling machine and the depth stop can be set easily by means of an axial position of the shank sleeve 22 on the tool shank 28. The stop sleeve 16 has an end-face stop ring 56 at the axial end thereof, which bottoms on the surface of a component to be machined when the depth stop is reached, wherein the tool 10 can continue to rotate freely, as the tool is freely rotatably connected to the stop sleeve 16 by means of the two bearings 14, 46.

REFERENCE LIST

10 Countersinking tool
12 Stop
14 Bearing
16 Stop sleeve
18 First bearing bushing
20 Second bearing bushing
22 Shank sleeve
24 Counter-bearing ring
26 Adjusting thread
28 Tool shank
30 Tool head
32 Lock nut
34 Bearing ring
36 Bearing connection sleeve
38 Adhesive connection
40 Second bearing
42 Clamping means
44 Clamping bolts
46 Second bearing
48 Drill shaft end region
50 Drilling, milling or countersinking tool with stop
52 Engagement recess
54 Cutting edge
56 Stop ring
58 Bearing clamping nut
60 Bearing clamping thread
62 Threaded tool shank
64 Quick-change tool shank
66 Tool head insertion pin
68 Shank sleeve mounting area of the tool shank
100 Stop sleeve adapter from the prior art
102 Tool head
104 Stop sleeve
106 Adapter shank
108 Screw-in thread
110 Adjustment ring
112 End sleeve
114 Fine adjustment device

The invention claimed is:

1. A stop for a rotary drilling, milling or countersinking tool, the stop comprising:
   a stop sleeve;
   a shank sleeve;
   at least a first bearing; and
   at least first and second bearing bushings,
   the stop sleeve freely rotatable relative to the shank sleeve,
   the first bearing bushing carrying the stop sleeve,
   the second bearing bushing fixed on the shank sleeve,
   the second bearing bushing non-rotational relative to the shank sleeve,
   the shank sleeve comprising a counter-bearing ring and at least a first bearing ring, the first bearing axially between the counter-bearing ring and the first bearing ring,
   the stop configured such that the shank sleeve can be pushed and fastened on an unthreaded shank of a rotary drilling, milling or countersinking tool.

2. The stop according to claim 1, wherein the shank sleeve is configured such that it can be adhesively bonded, pressed or clamped on the tool shank.

3. The stop according to claim 1, wherein the first bearing bushing is adhesively bonded or pressed into the stop sleeve.

4. A rotary drilling, milling or countersinking tool with a stop, comprising:
- a rotary drilling, milling or countersinking tool comprising a shank;
- a lock nut;
- a stop sleeve;
- a shank sleeve;
- at least a first bearing;
- at least first and second bearing bushings; and
- a lock nut
- the stop sleeve freely rotatable relative to the shank sleeve,
- the first bearing bushing carrying the stop sleeve,
- the second bearing bushing fixed on the shank sleeve,
- the second bearing bushing non-rotational relative to the shank sleeve,
- the shank sleeve comprising a counter-bearing ring and at least a first bearing ring, the first bearing axially between the counter-bearing ring and the first bearing ring,
- the shank sleeve fastened on an un-threaded region of the shank,
- the lock nut screw-threaded on a threaded region of the shank, the lock nut counter-locking the shank sleeve.

5. The stop according to claim 1, wherein at least one second axially offset bearing is arranged between the stop sleeve and shank sleeve.

6. The stop according to claim 1, wherein the shank sleeve comprises at least one radially acting clamping means, by means of which the shank sleeve can be clamped in a rotationally fixed and axially fixing manner on the unthreaded shank.

7. The stop according to claim 1, wherein the shank sleeve comprises at least a first radially acting clamping bolt.

8. The stop according to claim 1, wherein the shank sleeve comprises a clamping ring or a clamping collar, as a result of which the shank sleeve can be fixed in a clamping manner on the tool shank.

9. The stop according to claim 1, wherein the stop further comprises one or more adapter bushings which are plugged into the shank sleeve.

10. The stop according to claim 1, wherein a bearing clamping nut is arranged on a bearing clamping thread of the shank sleeve, so that a bearing play of the bearing can be set.

11. A drilling, milling or countersinking tool with a stop, wherein a stop according to claim 1 is fastened on a shank of a tool.

12. The stop according to claim 4, wherein the lock nut comprises a threaded tool shank or a quick-change tool shank.

13. The stop according to claim 7, wherein the tool shank comprises at least one radially oriented engagement recess or fixing thread for a rotationally fixed and axially locking engagement of the first radially acting clamping bolt.

14. The stop according to claim 1, wherein the shank sleeve comprises at least a first radially acting fixing screw.

15. The stop according to claim 14, wherein the tool shank comprises at least one radially oriented engagement recess or fixing thread for a rotationally fixed and axially locking engagement of the first radially acting fixing screw.

\* \* \* \* \*